United States Patent [19]

Sonobe et al.

[11] Patent Number: 5,527,643
[45] Date of Patent: Jun. 18, 1996

[54] CARBONACEOUS ELECTRODE MATERIAL FOR SECONDARY BATTERY AND PROCESS FOR PRODUCTION THEREOF

[75] Inventors: Naohiro Sonobe; Takao Iwasaki; Jiro Masuko, all of Iwaki, Japan

[73] Assignee: Kureha Kagaku Kogyo Kabushiki Kaisha, Tokyo, Japan

[21] Appl. No.: 295,066

[22] Filed: Aug. 26, 1994

[30] Foreign Application Priority Data

Sep. 3, 1993 [JP] Japan .................................. 5-242199
Apr. 28, 1994 [JP] Japan .................................. 6-111707

[51] Int. Cl.$^6$ .......................... H01M 4/58; C01B 31/04; H01B 1/04; C04B 35/00
[52] U.S. Cl. .......................... 429/218; 429/217; 429/232; 264/105; 252/502; 252/510; 423/448; 423/450; 423/460
[58] Field of Search ................................ 429/218, 217, 429/232, 194; 264/105; 252/502, 510; 423/448, 450, 460

[56] References Cited

U.S. PATENT DOCUMENTS

| | | | |
|---|---|---|---|
| 3,909,449 | 9/1975 | Nagai et al. ................................ | 502/9 |
| 4,945,014 | 7/1990 | Miyabayashi et al. ................. | 429/218 |
| 5,340,670 | 8/1994 | Takami et al. .......................... | 429/218 |

FOREIGN PATENT DOCUMENTS

| | | |
|---|---|---|
| 0165047 | 12/1985 | European Pat. Off. . |
| 0201038 | 11/1986 | European Pat. Off. . |
| 0460617A2 | 12/1991 | European Pat. Off. . |
| 0495613A2 | 7/1992 | European Pat. Off. . |
| 0547794A1 | 6/1993 | European Pat. Off. . |
| 0563988A1 | 10/1993 | European Pat. Off. . |
| 0573266A1 | 12/1993 | European Pat. Off. . |

OTHER PUBLICATIONS

Patent Abstracts of Japan, vol. 10, No. 258 (C–370) 4 Sep. 1986 & JP-A-61 083 611 (Mitsubishi Petrochem Co., Ltd.) 28 Apr. 1986.

Database WPI, Week 9432, Derwent Publications Ltd., London, GB; AN 94–258102 & JP-A-6 187 991 (Osaka Gas Co., Ltd.) 8 Jul. 1994.

Database WPI, Week 9432, Derwent Publications Ltd., London, GB; AN 94–258086 & JP-A-6 187 972 (Osaka Gas Co., Ltd.) 8 Jul. 1994.

Patent Abstracts of Japan, vol. 18, No. 139 (E–1519) 8 Mar. 1994 & JP-A-05 325 948 (Osaka Gas Co., Ltd.) 10 Dec. 1993.

*Primary Examiner*—Bruce F. Bell
*Attorney, Agent, or Firm*—Wenderoth, Lind & Ponack

[57] ABSTRACT

A non-aqueous solvent-type secondary battery having a large charge-discharge capacity and exhibiting a high utilization rate of an active substance, such as lithium, and an excellent charge-discharge cycle characteristic, can be constituted by using a carbonaceous electrode material having a specific microtexture. The carbonaceous electrode material is characterized by having an average (002)-plane spacing $d_{002}$ of 0.336–0.375 nm and a crystallite size in c-axis direction $Lc_{(002)}$ of at most 50 nm, respectively, as measured by X-ray diffraction method, and an optically anisotropic texture showing a fine mosaic texture when observed through a polarizing microscope. The carbonaceous material may suitably be produced through a process including the steps of: crosslinking a tar or pitch of a petroleum or coal origin, and carbonizing the crosslinked tar or pitch at a temperature of at least 800° C. under a reduced pressure or in an inert gas atmosphere.

14 Claims, 7 Drawing Sheets

CARBONACEOUS ELECTRODE MATERIAL FOR SECONDARY BATTERY AND PROCESS FOR PRODUCTION THEREOF

BACKGROUND OF THE INVENTION

1. Field of the Invention

The present invention relates to a carbonaceous electrode material for a secondary battery, more particularly a carbonaceous material suitable as an electrode material for a high-energy density non-aqueous solvent-type secondary battery, and a process for production thereof. The present invention also relates to an electrode structure comprising such a carbonaceous electrode material, and a non-aqueous solvent-type secondary battery having such an electrode structure.

2. Description of the Related Art

Accompanying the development of, e.g., video tape recorders and small-sized communication appliances reduced in size and weight, there has been an increasing demand for a secondary battery of a high energy density as a power supply for such appliances. Non-aqueous solvent-type lithium secondary batteries have been proposed therefor (e.g., Japanese Laid-Open Patent Application (JP-A) 57-208079, JP-A 62-90863, JP-A 62-122066 and JP-A 2-66856). These batteries use a negative electrode comprising a carbonaceous material doped with lithium instead an electrode of lithium metal so as to alleviate the danger of internal short circuit due to occurrence of dendorite and improve the charge-discharge characteristic, storage stability, etc.

In order to produce a battery of a high energy density, it is important that the carbonaceous material constituting the negative electrode can be doped and de-doped with a large amount of lithium. In order to provide a high-energy density per unit volume of a battery, it is important to use a carbonaceous material having a large capacity of doping and dedoping (liberation) of an active substance (i.e., lithium) and fill the negative electrode with as large a quantity as possible of the carbonaceous material.

In the above-mentioned prior proposals, it has been proposed to use graphite or a carbonaceous material obtained by carbonizing an organic material as a negative electrode material for non-aqueous solvent-type lithium secondary batteries.

Graphite has a large true density of 2.27 g/cm$^3$, and this is advantageous in filling a negative electrode with a large amount of carbonaceous material. When graphite is doped with lithium, a graphite intercalation compound is formed. In this instance, a graphitic material having a larger crystallite size in its c-axis direction is liable to receive a larger strain acting on the crystallites at the time of repetition of doping-dedoping, thus being liable to break the crystalline structure. Accordingly, a secondary battery prepared by using graphite or a carbonaceous material having a developed graphite structure is liable to have an inferior charge-discharge repetition performance. Further, in a battery prepared by using such a material having a developed graphite structure, the electrolyte is liable to decompose during operation of the battery in some cases.

On the other hand, a so-called amorphous carbonaceous material as obtained by carbonizing phenolic resin or furan resin can exhibit a high doping-dedoping capacity per unit weight but contains a small weight of carbonaceous material per unit volume because of a small true density on the order of 1.5 g/cm$^3$. As a result, a secondary battery prepared by constituting the negative electrode with such a carbonaceous material cannot necessarily have a high energy density per unit volume. Further, lithium having doped a negative electrode of such an amorphous carbonaceous material is liable to be not completely dedoped (liberated) but remain in a substantial amount, so that lithium as the active substance is liable to be wasted.

SUMMARY OF THE INVENTION

In view of the above-mentioned problems of the prior art, an object of the present invention is to provide a carbonaceous electrode material having a large true density, a large capacity for doping-dedoping of an active substance, such as lithium, and a small irreversible capacity defined as a difference between the doping capacity and the dedoping capacity, and also being capable of affording a secondary battery of a high energy density and with an excellent cycle repetition characteristic.

Another object of the present invention is to provide a process for producing such a carbonaceous electrode material.

Another object of the present invention is to provide an electrode structure by using such a carbonaceous material as described above, and also a non-aqueous solvent-type secondary battery including such an electrode structure.

According to our study, it has been found possible to provide a carbonaceous material capable of providing a non-aqueous solvent-type secondary battery having a large charge-discharge capacity, an excellent charge-discharge cycle characteristic and a small irreversible capacity (a high efficiency of active substance utilization) by properly controlling the microscopic structure of the carbonaceous material.

More specifically, according to the present invention, there is provided a carbonaceous electrode material for a non-aqueous solvent-type secondary battery, comprising a carbonaceous material having an average (002)-plane spacing $d_{002}$ of 0.336–0.375 nm and a crystallite size in c-axis direction $Lc_{(002)}$ of at most 50 nm, respectively, as measured by X-ray diffraction method, and an optically anisotropic texture showing a fine mosaic texture when observed through a polarizing microscope.

The carbonaceous material having the above-mentioned characteristics may be produced by crosslinking a tar or pitch of a petroleum or coal origin, and then carbonizing the crosslinked tar or pitch at a temperature of at least 800° C. under a reduced pressure or in an inert gas atmosphere.

By controlling the carbonizing conditions, the carbonaceous material of the present invention may be embodied as a first-type carbonaceous material characterized by $d_{002}$ of 0.340–0.375 nm and $Lc_{(002)}$ of at most 15 nm and being of a relatively low degree of graphitization, or a second-type carbonaceous material characterized by $d_{002}$ of 0.336–0.350 nm, $Lc_{(002)}$ which exceeds 15 nm and is at most 50 nm, and a crystallite size in a-axis direction $La_{(110)}$ of 5–50 nm and being of a relatively high degree of graphitization. Accordingly, the term "carbonaceous material" used herein refer to both the first and second types of carbonaceous materials described above, but a term "graphitic material" may also be used when the second-type carbonaceous material is selectively referred to.

According to another aspect of the present invention, there is provided an electrode structure for a non-aqueous solvent-type secondary battery, comprising: an electroconductive substrate and a composite electrode layer disposed on at least one surface of the electroconductive substance; the composite electrode layer comprising a carbonaceous electrode material as described above in a particulate form, and a binder.

According to a further aspect of the present invention, there is provided a non-aqueous solvent-type secondary battery, comprising, a positive electrode, a negative electrode, and a separator and a non-aqueous electrolytic solution disposed between the positive and negative electrodes; at least one of the positive and negative electrodes comprising an electrode structure as described above.

These and other objects, features and advantages of the present invention will become more apparent upon a consideration of the following description of the preferred embodiments of the present invention taken in conjunction with the accompanying drawings.

DETAILED DESCRIPTION OF THE INVENTION

A first characteristic to be satisfied by the first-type carbonaceous material according to the present invention is that it has an average (002) plane-spacing $d_{002}$, i.e., an average spacing between (002) planes as measured according to X-ray diffraction analysis, of 0.340–0.375 nm and a crystallite size in c-axis direction $Lc_{(002)}$ of at most 15 nm. In a secondary battery using a negative electrode material comprising a carbonaceous material having a developed graphite structure characterized by $d_{002}$ below 0.340 nm or $Lc_{(002)}$ exceeding 15 nm, the electrolytic solution can be liable to decompose on repetition of charge-discharge, thus resulting in an inferior charge-discharge cycle characteristic, depending on the species of the electrolytic solution used. A carbonaceous material having $d_{002}$ exceeding 0.375 nm is caused to have an increased irreversible capacity of an active substance, such as lithium, thus resulting in a lower rate of utilization of active substance. The first-type carbonaceous material may preferably have $d_{002}$ of 0.340–0.375 nm, further preferably 0.345–0.370 nm, yet further preferably 0.345–0.365 nm, and $Lc_{(002)}$ of at most 10 nm, further preferably at most 5 nm.

A first characteristic to be satisfied by the second-type carbonaceous material (graphitic material) according to the present invention is that it has $d_{002}$ of 0.336–0.350 nm, $Lc_{(002)}$ exceeding 15 nm but not exceeding 50 nm, and a crystallite size in a-axis direction $La_{(110)}$ of 5–50 nm. In a secondary battery using a negative electrode material comprising a graphitic material having a highly developed graphite structure characterized by $Lc_{(002)}$ of 50 nm, the graphite material is liable to collapse and the electrolytic solution is liable to decompose, respectively, on repetition of doping-dedoping of active substance. The graphitic material (second-type carbonaceous material) according to the present invention is accompanied with a difficulty that it is liable to cause decomposition of electrolytic solution when a certain species of electrolytic solution is used but, on the other hand, has advantages that it provides a higher energy density per unit volume because of a large true density and can realize a secondary battery causing only a small lowering in capacity in a rapid charge-discharge operation and providing a discharge curve with excellent flatness.

Further, a graphitic material with $La_{(110)}$ exceeding 50 nm is caused to have fewer crystallite edges, thus resulting in a slow rate of doping-dedoping of active substance. Further, a carbonaceous material with $d_{002}$ exceeding 0.350 nm can provide a secondary battery showing an inferior flatness of discharge curve in some cases. The second-type carbonaceous material may preferably have $d_{002}$ of 0.336–0.345 nm, $Lc_{(002)}$ exceeding 15 nm but not exceeding 40 nm and $La_{(110)}$ of 10–50 nm, more preferably $d_{002}$ of 0.337–0.342 nm, $Lc_{(002)}$ of 20–40 nm and $La_{(110)}$ of 15–50 nm The second characteristic to be satisfied by the carbonaceous material (including the first-type and second-type ones) according to the present invention is that it exhibits an optically anisotropic texture including a fine mosaic texture when observed through a polarizing microscope.

In a carbonaceous material having such a micro-texture, minute crystallites are present at random so that crystalline strain caused by doping-dedoping of active substance between crystalline layers becomes isotropic as a whole and the collapse of the crystal due to doping-dedoping of the active substance is suppressed. As a result, a secondary battery equipped with a negative electrode constituted from such a carbonaceous material is caused to have good charge-discharge cycle characteristic. The optically anisotropic texture may preferably be constituted by anisotropic elements having a size of at most 10 μm, further preferably at most 5 μm.

An electrode for a secondary battery may be constituted from a carbonaceous material, e.g., by a method wherein the carbonaceous material in the form of fine particles having a size of at most ca. 100 μm is shaped together with a binder to form a shaped product which is then electrically connected to an electroconductive substrate, or by a method wherein a paste composition comprising the carbonaceous material in the form of fine particles and a binder is applied onto an electroconductive substrate, such as a metal foil, and dried.

Accordingly, in order to increase the energy density per unit volume of a battery, a higher true density of the carbonaceous material is preferred. The first-type carbonaceous material according to the present invention may preferably have a true density of at least 1.70 g/cm$^3$, more preferably at least 1.75 g/cm$^3$, further more preferably at least 1.80 g/cm$^3$, within an extent of suppressed graphitization defined by the above-mentioned ranges of $d_{002}$ and $Lc_{(002)}$.

Further, the second-type carbonaceous material according to the present invention may preferably have a true density of at least 1.90 g/cm$^3$, more preferably at least 2.00 g/cm$^3$, further more preferably at least 2.10 g/cm$^3$ within an extent of controlled crystalline texture defined by the above-mentioned $d_{002}$, $Lc_{(002)}$ and $La_{(110)}$.

The carbonaceous material according to the present invention may for example be produced through the following process.

That is, a tar or pitch of a petroleum or coal origin is crosslinked and then carbonized at a temperature of at least 800° C. under a reduced pressure or in an inert gas atmosphere. Further, in order to obtain the graphitic material (second-type carbonaceous material), the carbonization step is caused to include a graphitization step at a temperature of at least 1800° C.

The crosslinking of the tar or pitch is performed in order to control the micro-texture of the carbonaceous material obtained after carbonizing the resultant crosslinked tar or pitch. In the process according to the present invention, the degree of crosslinking after the crosslinking treatment and conditions of the subsequent carbonization or graphitization are controlled in combination so as to appropriately control the micro-texture of the resultant carbonaceous material.

Figure 2:
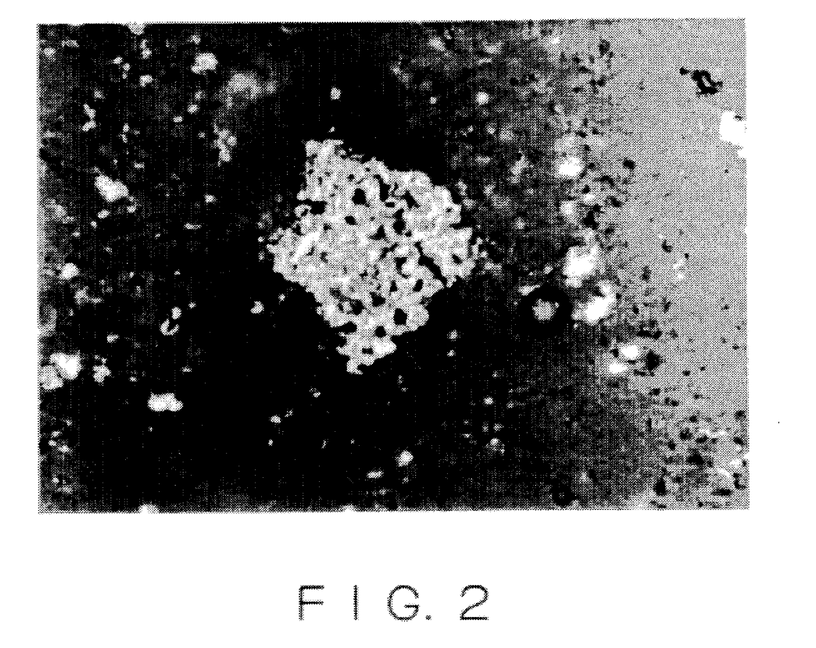
FIGS. 2–10 are polarizing microscopic photographs at a magnification of 1000 of carbonaceous materials obtained in Examples 3 (FIG. 2), 8 (FIG. 3) and 12 (FIG. 7) and Comparative Examples 2 (FIG. 4), 3 (FIG. 5), 4 (FIG. 6), 6 (FIG. 8), 7 (FIG. 9) and 9 (FIG. 10), respectively, appearing hereinafter.
Figure 3:
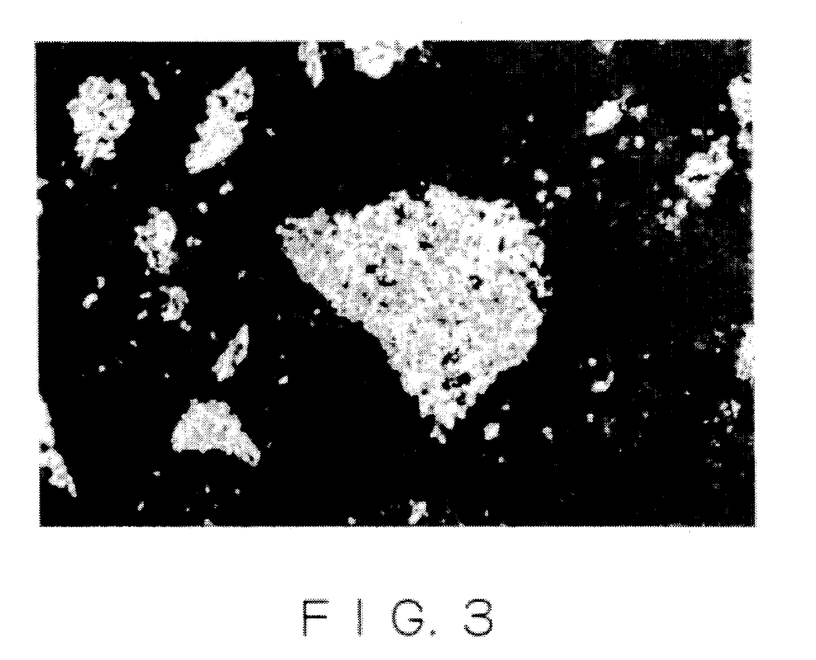

The crosslinking degree may be evaluated by observation of a ground sample of a carbonaceous material obtained by heat-treating a crosslinked tar or pitch sample at 1000° C. for 1 hour in a nitrogen stream through a polarizing microscope provided with cross nicol polarizers disposed at right angles at a magnification of, e.g., 1000. The thus-observed optically anisotropic texture shows a so-called flow texture for a sample having a low crosslinking degree (see, e.g., FIGS. 4 and 5 which are polarizing microscopic photographs of carbonaceous materials obtained in Comparative Examples 2 and 3 described hereinafter) and shows a fine mosaic texture for a sample having a larger crosslinking degree (see FIGS. 2 and 3 which are polarizing microscopic photographs of carbonaceous materials obtained in Examples 3 and 8 described hereinafter). As the crosslinking degree increases, the anisotropic elements in the observed optically anisotropic texture are caused to have smaller sizes until any optical anisotropy is not observed to result in an isotropic texture (see, e.g., FIG. 6 which is a polarizing microscopic photograph of a carbonaceous material obtained in Comparative Example 4 described hereinafter). The optically anisotropic texture of a crosslinked tar or pitch sample observed in a similar manner as described above, is not substantially changed thereafter regardless of the temperature level of the subsequent carbonization treatment. Accordingly, the crosslinking degree of a crosslinked tar or pitch before the carbonization treatment can also be evaluated by observation of the corresponding carbonaceous or graphitic material finally obtained after the carbonization or graphitization treatment. In case where the heat-treating temperature for the carbonization or graphitization is identical, a higher crosslinking degree generally leads to a larger $d_{002}$, a smaller $Lc_{(002)}$ and a smaller $La_{(110)}$ of the corresponding carbonaceous material after the heat treatment. In case where the crosslinking degree is identical, an increase in heat-treating temperature generally leads to a smaller $d_{002}$, a larger $Lc_{(002)}$ and a larger $La_{(110)}$.

The crosslinking treatment in the process according to the present invention is performed so that the optically anisotropic texture observed in the above-mentioned evaluation method becomes a fine mosaic texture and is suppressed so that the optically anisotropic texture does not reach an isotropic texture. The crosslinking treatment may preferably be proceeded so that the optically anisotropic (i.e., mosaic) elements or units constituting the fine mosaic anisotropic texture will have a size (based on a longer-axis diameter) of at most 10 μm, more preferably at most 5 μm. The lower size limit of the anisotropic elements in such that the mosaic elements can be sufficiently recognized and differentiated from an isotropic texture in a polarizing microscopic photograph at a magnification of 1000.

The starting material of the carbonaceous material in the process according to the present invention is a tar or pitch of a petroleum or coal origin, examples of which may include a petroleum-type tar or pitch by-produced in ethylene production, coal tar produced by dry distillation of coal, heavy fraction or pitch obtained from coal tar by removing low-boiling fractions by distillation, and tar or pitch obtained by liquefaction of coal. These tars or pitches can be used in mixture of two or more species. The crosslinking of the tar or pitch may for example be performed by heat-treating the tar or pitch together with nitric acid, acetyl nitrate, sulfur, etc., added thereto, or by oxidizing the tar or pitch with an oxidizing agent. Examples of the oxidizing agent may include oxidizing gases, such as $O_2$, $O_3$, $NO_2$, and mixture gases obtained by diluting these gases with air or nitrogen, and air, and oxidizing liquids, such as sulfuric acid, nitric acid and an aqueous hydrogen peroxide solution.

The crosslinking of a tar or pitch by heat-treating the tar or pitch at 150°–400° C. together with nitric acid, acetyl nitride, sulfur, etc., is a preferred method since the carbonization rate of the starting material is increased thereby to provide an increased yield of the carbonaceous material from the starting material.

The method of using nitric acid is a particularly preferred method because it allows a uniform crosslinking reaction and easy reaction control. Further, as nitric acid is inexpensive so that the method is also advantageous from an economical viewpoint.

More specifically, the crosslinking with nitric acid may be performed by adding nitric acid to a starting tar or pitch, stirring the resultant mixture to allow the reaction, gradually heating the mixture to a temperature of 150°–450° C., preferably 300°–400° C., and holding the mixture at that temperature for ca. 10 min. to 4 hours to cause the reaction. In order to prevent a precipitous reaction due to heat evolution caused by the addition of nitric acid, it is preferred to initially add the nitric acid gradually and allow the system under cooling to react at a temperature of at most 40° C. for ca. 1–3 hours, followed by the heating of the system. During or after completion of the reaction, it is possible to remove low-boiling components in the reaction system by distillation. By the removal of the low-boiling components, it becomes possible to reduce the amount of the volatile matter evolved during the subsequent carbonization step, thereby reducing the load on the apparatus and improving the processing efficiency of the carbonization.

The concentration of the nitric acid used need not be restricted particularly but may preferably be ca. 50–68%. The amount of nitric acid used may be varied depending on the hydrogen/carbon atomic ratio (H/C ratio), etc., of the tar or pitch used. The appropriate range thereof may be suitably determined by increasing or decreasing the amount so as to provide an appropriate crosslinking degree of carbonaceous material according to the above-mentioned crosslinking degree evaluation method.

In another method of the crosslinking treatment, a tar or a pitch of a low-softening point may be treated by distillation, air-blowing, etc., and the resultant pitch may be oxidized with an oxidizing agent. In this case, it is possible to adopt a method wherein the pitch is shaped into fine particles, fiber or films and then oxidized, but it is preferred to adopt the following method for uniform and easy oxidation.

That is, a pitch, such as petroleum pitch or coal pitch, is mixed under heating with an additive comprising an aromatic compound of two or three rings having a boiling point of at least 200° C. or a mixture of such aromatic compounds, and the mixture is then shaped to provide a shaped pitch product. Then, the additive is removed from the shaped pitch product by extraction with a solvent having a low dissolving power to the pitch and a higher dissolving power to the additive, to leave a porous pitch product, which is then oxidized Removal of the additive from the shaped pitch product by extraction converts the shaped product into a porous body, thereby facilitating the crosslinking treatment by oxidation. The additive may for example comprise one or a mixture of two or more species selected from naphthalene, methylnaphthalene, phenylnaphthalene, benzylnaphthalene, methylanthracene, phenanthrene and biphenyl. The addition amount thereof may preferably be in the range of 10–50 wt. parts per 100 wt. parts of the pitch.

The mixing of the pitch and the additive may be performed in a molten state under heating in order to accomplish uniform mixing. The mixture of the pitch and the additive may preferably be shaped into particles having a size of 1 mm or smaller. The shaping may be performed in a molten state or, e.g., by pulverization, after cooling.

Suitable examples of the solvent for removing the additive from the mixture of the pitch and the additive may include: aliphatic hydrocarbons, such as butane, pentane, hexane and heptane; mixtures comprising principally aliphatic hydrocarbons, such as naphtha and kerosene; and aliphatic alcohols, such as methanol, ethanol, propanol and butanol.

By extracting the additive from the shaped mixture product with such a solvent, it is possible to remove the additive from the shaped product while retaining the shape of the product. At this time, it is assumed that holes are formed at parts from which the additive is removed, thereby providing a uniformly porous pitch product.

The thus-obtained porous pitch product is then subjected to oxidation with an oxidizing agent as described above, thereby effecting the crosslinking.

As the oxidizing agent, it is convenient and economically advantageous to use an oxygen-containing gas, such as air and a gaseous mixture of air and another gas such as a combustion gas, for the crosslinking treatment at 120°–300° C. In this instance, the pitch may preferably have a softening point of at least 150° C. since a pitch having a lower softening points is liable to be melted during oxidation, thus making the oxidation difficult.

The degree of the crosslinking treatment may reliably be determined by the above-mentioned crosslinking degree evaluation methods but, as another measure, it is preferred to proceed with the oxidation so that the porous pitch after the oxidation will have an oxygen content of 1–5% by elementary analysis.

In case of obtaining the first-type carbonaceous material according to the process of the present invention, the carbonization may be performed under a reduced pressure or in an inert gas atmosphere at a temperature of at least 800° C., preferably 900°–2000° C., further preferably 1000°–1600° C. The carbonization temperature may be determined in combination with the crosslinking degree, but a temperature below 800° C. is liable to result in insufficient carbonization and is not preferred. The carbonization is performed under a reduced pressure or in an inert gas atmosphere so as to prevent the oxidation of the carbonizing material. In the case of the carbonization under a reduced pressure, the pressure may be at most 10 kPa (=ca. 0.1 atm), preferably at most 5 kPa, further preferably at most 3 kPa. The inert gas may for example be nitrogen gas, argon gas, helium gas, etc.

The graphitization treatment for providing the second-type carbonaceous material (graphitic material) may be performed under a reduced pressure or in an inert gas atmosphere at a temperature of at least 1800° C., preferably at least 2200° C., further preferably at least 2600° C. The inert gas may for example be argon gas, helium gas, etc.

In case where a particulate carbonaceous material is required, such a particulate carbonaceous material may be obtained by pulverizing the carbonaceous material after the completion of the carbonization. Alternatively, the crosslinked tar or pitch may be thermally treated in an inert gas atmosphere at 350°–700° C. in advance of the carbonization so as to cause polycondensation simultaneously with removal of the low-boiling components, thereby providing a carbon precursor having a volatile content of at most 15%, and the carbon precursor, after being pulverized to an average particle size of at most 100 μm, preferably at most 50 μm, may be carbonized to produce a particulate carbonaceous material.

The reduction of the volatile content of the carbon precursor to at most 15% is performed so as to prevent the melting and melt-sticking of the pulverized particles at the time of the carbonization. The volatile content of the carbon precursor may preferably be reduced to at most 10%, further preferably at most 5%.

The carbon precursor before the carbonization may be very easily pulverized and cause little wearing of the pulverizing machine compared with the carbonized product, so that the process including the pulverization before the carbonization is very advantageous. Further, the reduction of the volatile content in the carbon precursor is preferred since it reduces the occurrence of tar and decomposition gas in the carbonization step and also decreases the load of the carbonization step.

In case of using the carbonaceous material according to the present invention for producing an electrode of a non-aqueous solvent-type secondary battery, the carbonaceous material may be optionally formed into fine particles having an average particle size of 5–100 μm and then mixed with a binder stable against a non-aqueous solvent, such as polyvinylidene fluoride, polytetrafluoroethylene or polyethylene, to be applied onto an electroconductive substrate, such as a circular or rectangular metal plate, to form, e.g., a 10–200 μm-thick layer. The binder may preferably be added in a proportion of 1–20 wt. % of the carbonaceous material. If the amount of the binder is excessive, the resultant electrode is liable to have too large an electric resistance and provide the battery with a large internal resistance. On the other hand, if the amount of the binder is too small, the adhesion of the carbonaceous material particles with each other and with the electroconductive substrate is liable to be insufficient. The above described formulation and values have been set forth with respect to production of a secondary battery of a relatively small capacity, whereas, for production of a secondary battery of a larger capacity, it is also possible to form the above-mentioned mixture of the carbonaceous material fine particles and the binder into a thicker shaped product, e.g., by press-forming, and electrically connect the shaped product to the electroconductive substrate.

The carbonaceous material of the present invention can also be used as a positive electrode material for a non-aqueous solvent-type secondary battery by utilizing its good doping characteristic but may preferably be used as a negative electrode material of a non-aqueous solvent-type secondary battery, particularly for constituting a negative electrode to be doped with lithium as an active substance of a lithium secondary battery.

In the latter case, the positive electrode material may comprise a complex metal chalcogenide represented by a general formula: $LiMY_2$ (wherein M denotes at least one species of transition metals, such as Co and Ni, and Y denotes a chalcogen, such as O or S), particularly a complex metal oxide inclusive of $LiCoO_2$ as a representative. Such a positive electrode material may be formed alone or in combination with an appropriate binder into a layer on an electroconductive substrate.

The non-aqueous solvent-type electrolytic solution used in combination with the positive electrode and the negative electrode described above may generally be formed by dissolving an electrolyte in a non-aqueous solvent. The non-aqueous solvent may comprise one or two or more species of organic solvents, such as propylene carbonate, ethylene carbonate, dimethoxyethane, diethoxyethane, γ-butyrolactone, tetrahydrofuran, 2-methyl-tetrahydrofuran, sulfolane, and 1,3-dioxolane. Examples of the electrolyte may include $LiClO_4$, $LiPF_6$, $LiBF_4$, $LiCF_3SO_3$, $LiAsF_6$, $LiCl$, $LiBr$, $LiB(C_6H_5)_4$, and $LiCH_3SO_3$.

In the case of using the second-type carbonaceous material (graphitic material) according to the present invention for producing a non-aqueous solvent-type secondary battery, the non-aqueous solvent used in combination therewith may preferably comprise a solvent mixture of ethylene carbonate with, e.g., diethyl carbonate, dimethyl carbonate, or diethoxyethane, and the electrolyte may preferably comprise $LiPF_6$ or $LiBF_4$. It is particularly preferred to use a non-aqueous solvent-type electrolytic solution obtained by dissolving $LiPF_6$ or/and $LiBF_4$ in a solvent mixture of ethylene carbonate and diethyl carbonate because it hardly decomposes during charge-discharge cycles of the resultant secondary battery.

A secondary battery of the present invention may generally be formed by disposing the above-formed positive electrode layer and negative electrode layer opposite to each other, optionally with a liquid-permeable separator composed of, e.g., unwoven cloth or other porous materials, disposed therebetween, and dipping the positive and negative electrode layers together with an intermediate permeable separator in an electrolytic solution as described above.

As described above, according to the present invention, a tar or pitch is crosslinked and carbonized to product a carbonaceous material, while appropriately controlling the micro-texture of the resultant carbonaceous material. As a result, it has become possible to provide a carbonaceous material which has a high density and a large capacity of doping-dedoping of an active substance and yet has a small irreversible capacity defined as a difference between the doping and dedoping capacities.

Further, in the carbonaceous material, minute anisotropic elements are aligned at random so that the respective carbonaceous particles are isotropic as a whole and the crystallites are thin. As a result, the strain occurring in the crystallites at the time of doping-dedoping of an active substance is decreased and the directions of the strain are aligned at random, so that the collapse of the carbonaceous material due to the doping-dedoping can be prevented.

Accordingly, the carbonaceous material according to the present invention exhibits excellent characteristics as a carbonaceous electrode material for a non-aqueous solvent-type secondary battery capable of effectively utilizing an active substance, having excellent charge-discharge cycle characteristics and exhibiting a high energy density. Further, the use of the graphitic material (second-type carbonaceous material) according to the present invention is particularly advantageous in providing a secondary battery exhibiting excellent rapid charge-discharge characteristic and high energy density.

Incidentally, the parameters $d_{002}$, $Lc_{(002)}$, $La_{(110)}$, true density, volatile content and softening point of pitch and the microscopic observation characterizing the carbonaceous material according to the present invention are based on the measurement or tests performed in the following manners:
[$d_{002}$, $Lc_{(002)}$ and $La_{(110)}$ of carbonaceous material].

A powdery sample of a carbonaceous materials packed in an aluminum-made sample cell and is irradiated with monochromatic CuKα rays (wavelength λ=0.15418 nm) through a graphite monochromator to obtain an X-ray diffraction pattern. The peak position of the diffraction pattern is determined by the center of gravity method (i.e., a method wherein the position of a gravity center of diffraction lines is obtained to determine a peak position as a 2θ value corresponding to the gravity center) and calibrated by the diffraction peak of (111) plane of high-purity silicon powder as the standard substance. The $d_{002}$ value is calculated from the Bragg's equation shown below.

$Lc_{(002)}$ is calculated by the Scherrer's equation shown below based on a value $β_{1/2}$ which is a difference obtained by subtracting a full width at a half maximum intensity of the (111) diffraction peak of the standard high-purity silicon powder substance from the full width at a half maximum intensity of the (002) diffraction peak of a sample carbonaceous material. Herein, the shape factor K is set to 0.9.

$La_{(110)}$ is calculated also by the Scherrer's equation shown below based on a value $β_{1/2}$ obtained from the full width at a half maximum intensity of the (110) diffraction peak of a sample carbonaceous material and the full width at a half maximum intensity of (331) diffraction peak of the high-purity silicon powder substance according to the Alexander curve. Herein, the shape factor K is again set to 0.9.

$d_{002}=λ/(2·\sinθ)$ (Bragg's equation)

$L=(k·λ)/(β_{1/2}·\cosθ)$ (Scherrer's equation)

[True density]

The true density of a carbonaceous material sample is measured pycnometrically with methanol according to a method prescribed in JIS R7212.

[Volatile content]

The volatile content of a sample pitch is measured according to JIS R7212 wherein the sample is heated at 800° C. for 30 min.

[Softening point]

The softening point of a sample pitch is measured by placing 1 g of a sample pulverized into particles of at most 250 μm in a cylinder having a sectional area of 1 cm² and equipped with a 1 mm-dia. nozzle at its bottom, and the sample is heated at a rate of 6° C./min. under a load of 9.8 N/cm² (=10 kg/cm²). As the temperature increases, the sample particles are softened to provide an increased packing rate, thus showing a volume decrease, which however ceases at or above a certain temperature. On further temperature increase, the sample melts and starts to flow through the nozzle at the cylinder bottom. The temperature at which the volume decrease of the sample ceases is defined as the softening point of the sample. Incidentally, a sample having a high softening point can fail to flow through the nozzle.

[Polarizing microscopic observation]

A sample for the observation is prepared by (i) in case of a powder carbonaceous material, adding ca. 10 wt. % of the carbonaceous material into liquid epoxy resin and, after sufficient mixing, charging the resultant mixture in a mold frame (in a diameter of 25 mm) of silicone rubber, or (ii) in case of a particle-shaped or block-shaped carbonaceous material, optionally formulating the carbonaceous material into particles of several millimeters in diameter and embedding several particles within liquid epoxy resin charged in the above-mentioned mold frame, respectively followed by curing the epoxy resin at 120° C. for 24 hours. The resultant cured epoxy resin is cut at an appropriate part thereof so as to expose the embedded carbonaceous material at the surface, followed by buffing. Then, the surface is observed through a polarizing microscope equipped with right-angle cross nicol polarizers at a magnification of 1000.

Herein, the expression of "at most A μm" (A is preferably 10, more preferably 5, in this invention) with respect to the size of optically anisotropic elements constituting the optically anisotropic texture refers to a size of optically anisotropic (i.e., mosaic) elements or units such that, when non-overlapping 10 regions of a sample carbonaceous material are taken and observed by the above-mentioned microscopic observation, the total area of optically anisotropic elements having a size of at least A μm (in terms of a longer-axis diameter) occupies at most 10% of the total area of the carbonaceous material, respectively in the field of the observation.

Hereinbelow, the present invention will be described more specifically based on Examples, Reference Example and Comparative Examples.

EXAMPLE 1

A reaction vessel equipped with a stirrer and having an inner volume of 20 liters was charged with 15 kg of ethylene bottom oil having a residual carbon content of 14.1% and a specific gravity (a ratio of the sample mass at 15° C. and the mass of pure water having an equal volume at 4° C.) of 1.09, and 2 kg of 61%-nitric acid was added thereto under stirring and cooling so as to keep the temperature at 40° C. or below, followed by 2 hours of reaction. Then, the mixture was held at 80° C. for 1 hour, heated to 380° C. at a rate of 100° C./hr. and reacted at 380° C. for 2 hours, followed by cooling to obtain a pitchy substance at a yield of 36.1% with respect to the starting ethylene bottom oil.

The pitchy substance showed a softening point of 284° C., a volatile content of 28.3%, an oxygen content of 0.5%, a nitrogen content of 1.3%, and an H/C atomic ratio of 0.63.

The pitchy substance in a block state was heated in a nitrogen gas stream at a rate of 100° C./h to 1300° C., and held at 1300° C. for 1 hour for carbonization. During the carbonization stage, the pitchy substance once melted and then solidified again to form a carbonaceous material in a block form. The carbonaceous material after cooling was pulverized to provide a carbonaceous material having an average particle size (diameter) of 25 μm. The properties of the thus-obtained carbonaceous material are summarized in Table 1 appearing hereinafter.

EXAMPLE 2

68 kg of a petroleum pitch having a softening point of 210° C., a quinoline-insoluble content of 1 wt. % and an H/C atomic ratio of 0.63, and 32 kg of naphthalene, were placed in a 300 liter-pressure-resistant vessel equipped with stirring blades, melt-mixed under heating at 190° C. and, after being cooled to 80°–90° C., extruded to form an about 500 μm dia.-string-shaped product. Then, the string-shaped product was broken so as to provide a diameter-to-length ratio of about 1.5, and the broken product was charged into an aqueous solution containing 0.53% of polyvinyl alcohol (saponification degree=88%) and heated to 93° C., followed by stirring for dispersion and cooling to form a slurry of pitch spheres. After removing a major part of water by filtration, the pitch spheres were subjected to extraction with about 6 times by weight of n-hexane to remove the naphthalene in the pitch spheres. The thus-obtained porous spherical pitch was held at 165° C. for 1 hour for oxidization while passing heated air, thereby obtained an oxidized pitch.

The oxidized pitch showed an oxygen content of 2.0%. The oxidized pitch was then heat-treated at 480° C. for 1 hour to obtain a carbon precursor having a volatile content of 4.7%. The carbon precursor was pulverized to form carbon precursor particles having an average particle size of ca. 25 μm.

Then, the carbon precursor particles were carbonized in a nitrogen stream at 1000° C. for 1 hour to obtain a carbonaceous material. The properties of the thus-obtained carbonaceous material are shown in Table 1 appearing hereinafter.

EXAMPLES 3–5

Carbonaceous materials were prepared in the same manner as in Example 2 except that the carbonization temperatures were changed to 1200° C. (Example 3), 1400° C. (Example 4) and 1800° C. (Example 5), respectively. The properties of the carbonaceous materials are also shown in Table 1.

EXAMPLE 6

The oxidized pitch in Example 2 was heat-treated in a nitrogen atmosphere at 450° C. for 1 hour to obtain a carbon precursor having a volatile content of 11.4%. The carbon precursor, after being pulverized to an average particle size of 30 μm, was carbonized under a reduced pressure of 0.3 kPa at 1200° C. for 1 hour, to obtain a carbonaceous material. The properties thereof are shown in Table 1.

EXAMPLE 7

The porous spherical pitch in Example 2 was oxidized with air at 170° C. for 1 hour to form an oxidized pitch having an oxygen content of 2.7%, followed by heating in a nitrogen atmosphere at 600° C. for 1 hour to obtain a carbon precursor having a volatile content of at most 2%. The carbon precursor was pulverized to an average particle size of ca. 25 μm and then carbonized in a nitrogen gas atmosphere at 1200° C. for 1 hour, to obtain a carbonaceous material. The properties thereof are shown in Table 1.

EXAMPLE 8

The porous spherical pitch in Example 2 was oxidized with air at 180° C. for 1 hour to form an oxidized pitch having an oxygen content of 3.4%, followed by heating in a nitrogen atmosphere at 600° C. for 1 hour to obtain a carbon precursor having a volatile content of at most 2%. The carbon precursor was pulverized to an average particle size of ca. 25 μm and then carbonized in a nitrogen gas atmosphere at 1200° C. for 1 hour, to obtain a carbonaceous material. The properties thereof are shown in Table 1.

The carbonaceous materials of the above Examples 1–8 all showed an optically anisotropic texture of a fine mosaic. Polarizing microscopic photographs (×1000) of the carbonaceous materials of Examples 3 and 8 are representatively shown as FIGS. 2 and 3.

REFERENCE EXAMPLE 1

A carbonaceous material was prepared in the same manner as in Example 2 except that the carbonization temperature was changed to 2000° C. The properties of the carbonaceous material are also shown in Table 1. The carbonaceous material showed an optically anisotropic texture of a fine mosaic as observed through a polarizing microscope (×1000).

COMPARATIVE EXAMPLE 2

The petroleum pitch used in Example 2 was heat-treated in a nitrogen atmosphere at 600° C. for 1 hour and pulverized to form a carbon precursor particles having an average particle size of 25 μm. The carbon precursor particles were carbonized at 1200° C. for 1 hour to obtain a carbonaceous material.

Figure 4:
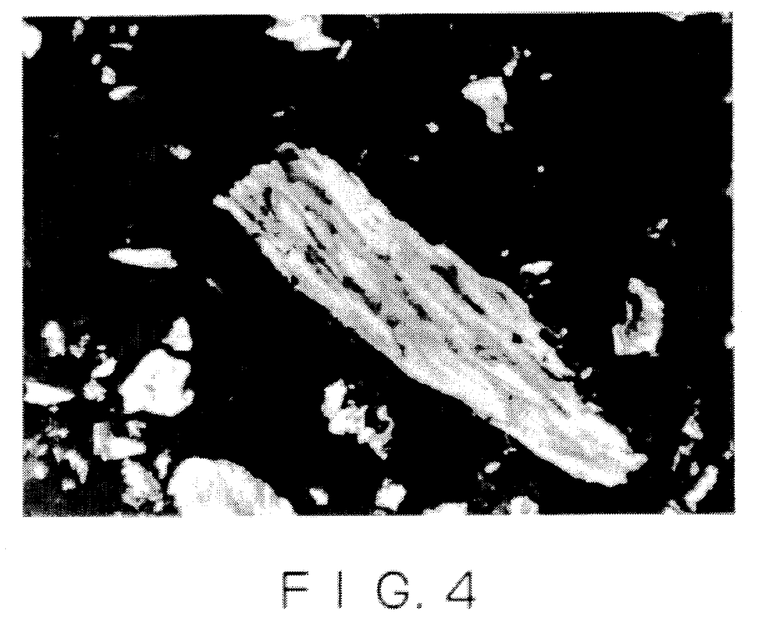

As a result of observation through a polarizing microscope, the carbonaceous material exhibited an optically anisotropic texture which was not of a fine mosaic but of a flow texture as shown in FIG. 4 which is a polarizing microscopic photograph (×1000) thereof. The properties of the carbonaceous material are also shown in Table 1.

COMPARATIVE EXAMPLE 3

A carbonaceous material was prepared by processing polyvinyl chloride of an average polymerization degree of 700 in the same manner as in Comparative Example 2.

Figure 5:
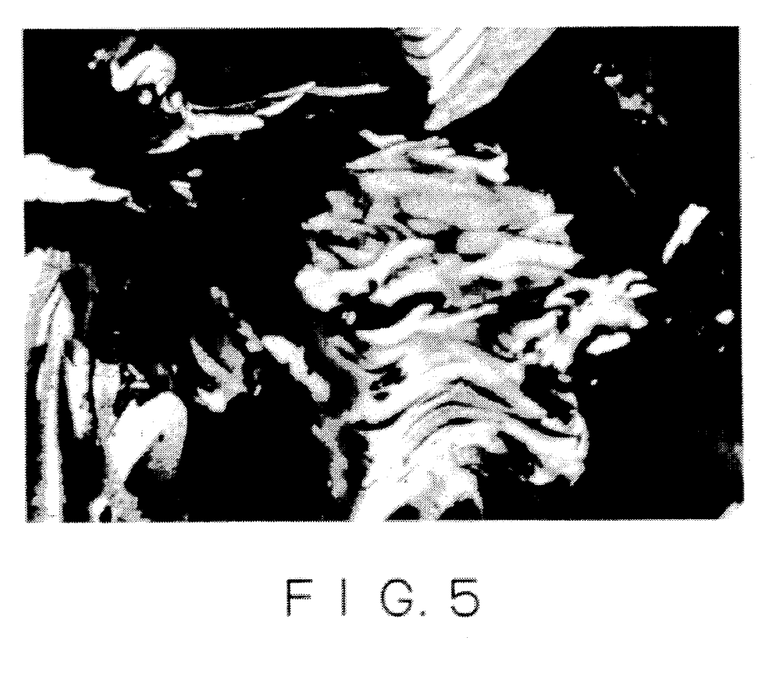

As a result of polarizing microscopic observation, the carbonaceous material exhibited an optically anisotropic texture which was not of a fine mosaic but of a flow texture as shown in FIG. 5 which is a polarizing microscopic photograph (×1000) thereof. The properties are also shown in Table 1.

COMPARATIVE EXAMPLE 4

A phenolic resin ("Bellpearl C-800", available from Kanebo K.K.) was pre-cured at 170° C. for 3 min., and then cured at 130° C. for 8 hours. Then, the cured resin was heated in a nitrogen atmosphere at a rate of 250° C./h to 1200° C. and held at 1200° C. for 1 hour, followed by cooling to prepare a phenolic resin-calcined carbon, which was then pulverized to an average particle size of 20 μm, thus providing a carbonaceous material.

Figure 6:
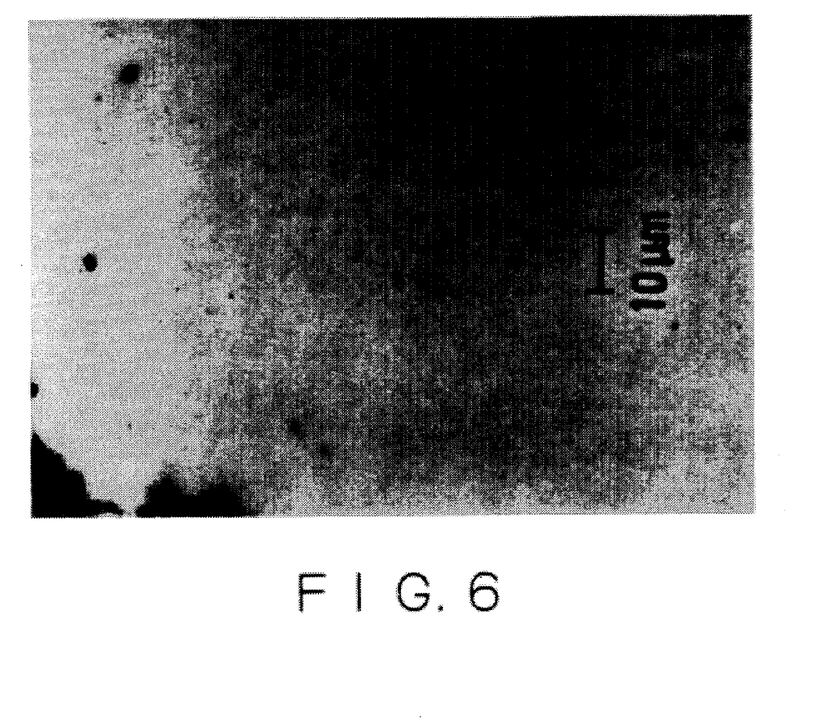

The carbonaceous material in a lump or block state before the pulverization was observed through a polarizing microscope. As a result, the carbonaceous material failed to show an optically anisotropic texture but showed an isotropic texture as shown in FIG. 6 which is a polarizing microscopic photograph (×1000) thereof. In FIG. 6, the entire view field is occupied with the lump-state carbon. The properties of the carbonaceous material are also shown in Table 1.

COMPARATIVE EXAMPLE 5

A furan resin ("Hitafuran VF-303", available from Hitachi Kasei K.K.) was cured at 100° C. for 14 hours. Then, the cured resin was heated in a nitrogen atmosphere at a rate of 250° C./hr to 1200° C. and held at 1200° C. for 1 hour, followed by cooling, to prepare a furan resin-calcined carbon, which was then pulverized to an average particle size of 20 μm, thus providing a carbonaceous material.

As a result of observation through a polarizing microscope, the carbonaceous material exhibited a texture which was not optically anisotropic but isotropic. The properties of the carbonaceous material are also shown in Table 1.

[Doping/de-doping capacity for active substance]

The carbonaceous materials obtained in Examples and Comparative Examples were respectively used to prepare a non-aqueous solvent-type secondary battery (cell) and the performances thereof were evaluated in the following manner.

The carbonaceous material is generally suited for constituting a negative electrode of a non-aqueous solvent secondary battery. However, in order to accurately evaluate the performances of a carbonaceous material inclusive of a doping capacity (A) and a de-doping capacity (B) for a cell active substance and also an amount of the cell active substance remaining in the carbonaceous material without being dedoped (i.e., "irreversible capacity" (A–B)) without being affected by a fluctuation in performance of a counter electrode material, a lithium metal electrode in an amount of large excess showing a stable performance was used as a negative electrode, and each carbonaceous material prepared above was used to constitute a positive electrode, thereby forming a lithium secondary battery, of which the performances were evaluated.

The positive electrode (carbonaceous materials electrode) was prepared as follows.

Each carbonaceous material in an amount of 90 wt. parts and 10 wt. parts of polyvinylidene fluoride were mixed together with N-methyl-2-pyrrolidone to form a paste composite, which was then applied uniformly onto a copper foil. The composite, after being dried, was peeled off the copper foil and stamped into a 21 mm-dia. disk. The disk was then press-bonded onto a 21-mm dia. circular shaped net of stainless steel to form a positive electrode containing about 40 mg of the carbonaceous material. On the other hand, a negative electrode was prepared by stamping a 1 mm thick-sheet of lithium metal into a 21 mm-dia. disk.

The thus-prepared positive and negative electrodes were disposed opposite to each other with a porous polypropylene film as a separator disposed therebetween, and the resultant structure was dipped in an electrolytic solution comprising a 1:1 (by volume)-mixture solvent of propylene carbonate and dimethoxyethane and $LiClO_4$ dissolved therein at a rate of 1 mol/liter, thereby forming a non-aqueous solvent-type lithium secondary battery.

In the lithium secondary battery thus constituted, the carbonaceous material in the positive electrode was doped with lithium at a current density of 0.5 $mA/cm^2$. More specifically, the doping was effected by repeating a cycle including 1 hour of current conduction and 2 hours of pause until the equilibrium potential between the positive and negative electrodes reached 0 volt. The electricity thus flowed was divided by the weight of the carbonaceous material to provide a doping capacity (A) in terms of mAh/g. Then, in a similar manner, a current was flowed in a reverse direction to dedope the lithium from the doped carbonaceous material. The dedoping was effected by repeating a cycle including 1 hour of current condition at a current density of 0.5 $mA/cm^2$ and 2 hours of pause until the terminal voltage reached 1.5 volts as the cut-off voltage. The electricity thus flowed was divided by the weight of the carbonaceous material to provide a dedoping capacity (B) in terms of mAh/g. Then, an irreversible capacity (A–B) was calculated as a difference between the doping capacity (A) and the dedoping capacity (B), and a discharge efficiency (%) was obtained by dividing the dedoping capacity (B) with the doping capacity (A) and multiplying the quotient (B/A) with 100. The discharge efficiency is a measure of effective utilization of the active substance.

The performances of the lithium secondary batteries using positive electrodes of the respective carbonaceous materials measured in the above-described manner are summarized in Table 2.

[Cell charge-discharge cycling test]

The performances of some carbonaceous materials as a negative electrode material were evaluated in the following manner.

TABLE 1

| | Carbonizing conditions | | | Properties of carbonaceous materials | | | |
|---|---|---|---|---|---|---|---|
| Example | Raw material** | Atmosphere | Temperature (°C.) | True density (g/cm$^3$) | $d_{002}$ (nm) | $Lc_{(002)}$ (nm) | Optical anisotropic texture |
| Ex. 1 | petro. tar | $N_2$ | 1300 | 1.97 | 0.353 | 2.2 | fine mosaic |
| 2 | petro. pitch | $N_2$ | 1000 | 1.78 | 0.358 | 1.5 | fine mosaic |
| 3 | petro. pitch | $N_2$ | 1200 | 1.98 | 0.356 | 2.3 | fine mosaic |
| 4 | petro. pitch | $N_2$ | 1400 | 2.05 | 0.351 | 3.9 | fine mosaic |
| 5 | petro. pitch | $N_2$ | 1800 | 2.13 | 0.350 | 11.1 | fine mosaic |
| 6 | petro. pitch | reduced press. | 1200 | 1.88 | 0.356 | 2.3 | fine mosaic |
| 7 | petro. pitch | $N_2$ | 1200 | 1.80 | 0.364 | 1.6 | fine mosaic |
| 8 | petro. pitch | $N_2$ | 1200 | 1.73 | 0.371 | 1.4 | fine mosaic |
| Ref. Ex. 1 | petro. pitch | $N_2$ | 2000 | 2.16 | 0.344 | 18.2 | fine mosaic |
| Comp. Ex. 2 | petro. pitch | $N_2$ | 1200 | 1.96 | 0.352 | 2.1 | flow |
| 3 | PVC | $N_2$ | 1200 | 2.02 | 0.356 | 2.3 | flow |
| 4 | phenolic resin | $N_2$ | 1200 | 1.49 | 0.381 | 1.1 | isotropic |
| 5 | furan resin | $N_2$ | 1200 | 1.47 | 0.378 | 1.2 | isotropic |

**petro. tar: petroleum tar
petro. pitch: petrolem pitch

TABLE 2

| | Cell performances | | | |
|---|---|---|---|---|
| Example | Doping capacity (A) (mAh/g) | Dedoping capacity (B) (mAh/g) | Irreversible capacity (A-B) (mAh/g) | Discharge efficiency (B/A) × 100 (%) |
| Ex. 1 | 314 | 244 | 70 | 77.7 |
| 2 | 533 | 397 | 136 | 74.4 |
| 3 | 305 | 260 | 45 | 85.2 |
| 4 | 271 | 233 | 38 | 85.9 |
| 5 | 304 | 228 | 76 | 75.0 |
| 6 | 370 | 316 | 55 | 85.1 |
| 7 | 375 | 305 | 70 | 81.3 |
| 8 | 410 | 330 | 80 | 80.4 |
| Ref. Ex. 1 | 345 | 197 | 148 | 57.1 |
| Comp. Ex. 2 | 332 | 270 | 62 | 81.3 |
| 3 | 336 | 278 | 58 | 82.2 |
| 4 | 534 | 291 | 243 | 54.5 |
| 5 | 681 | 428 | 253 | 62.8 |

In view of the cell performances shown in Table 2 while referring to material properties shown in Table 1, it is understood that the secondary batteries (cells) prepared by using the carbonaceous materials of Examples showed smaller irreversible capacities and thus higher efficiencies of utilizing active substances, compared with the batteries prepared by using amorphous carbonaceous materials obtained in Comparative Examples 4 and 5.

The secondary battery prepared by using the carbonaceous material of Reference Example 1 showed a large irreversible capacity. This may possibly be attributable to a developed crystalline structure of the carbonaceous material of Reference Example 1 so that the electricity used for decomposition of the electrolytic solution could be observed as an irreversible capacity.

A comparative test was performed by the carbonaceous material of Example 3 and the carbonaceous materials of Comparative Examples 2 and 3 showing an optically anisotropic flow texture.

A negative electrode was prepared in the same manner as the carbonaceous material electrode (carbonaceous material weight=40 mg) used as the positive electrode in the above-described Doping/Dedoping test.

A positive electrode was prepared by sufficiently mixing 91 wt. parts of $LiCoO_2$, 6 wt. parts of graphite powder and 3 wt. parts of polyvinylidene fluoride together with N-methyl-2-pyrrolidone to form a paste mixture, followed by drying. The thus-dried mixture was then shaped in a mold into a positive electrode in the form of a 21 mm-dia. disk containing 200 mg of $LiCoO_2$.

By using the negative and positive electrodes, a secondary battery (cell) was prepared otherwise in the same manner as in the above-described Doping/Dedoping test.

Figure 1:
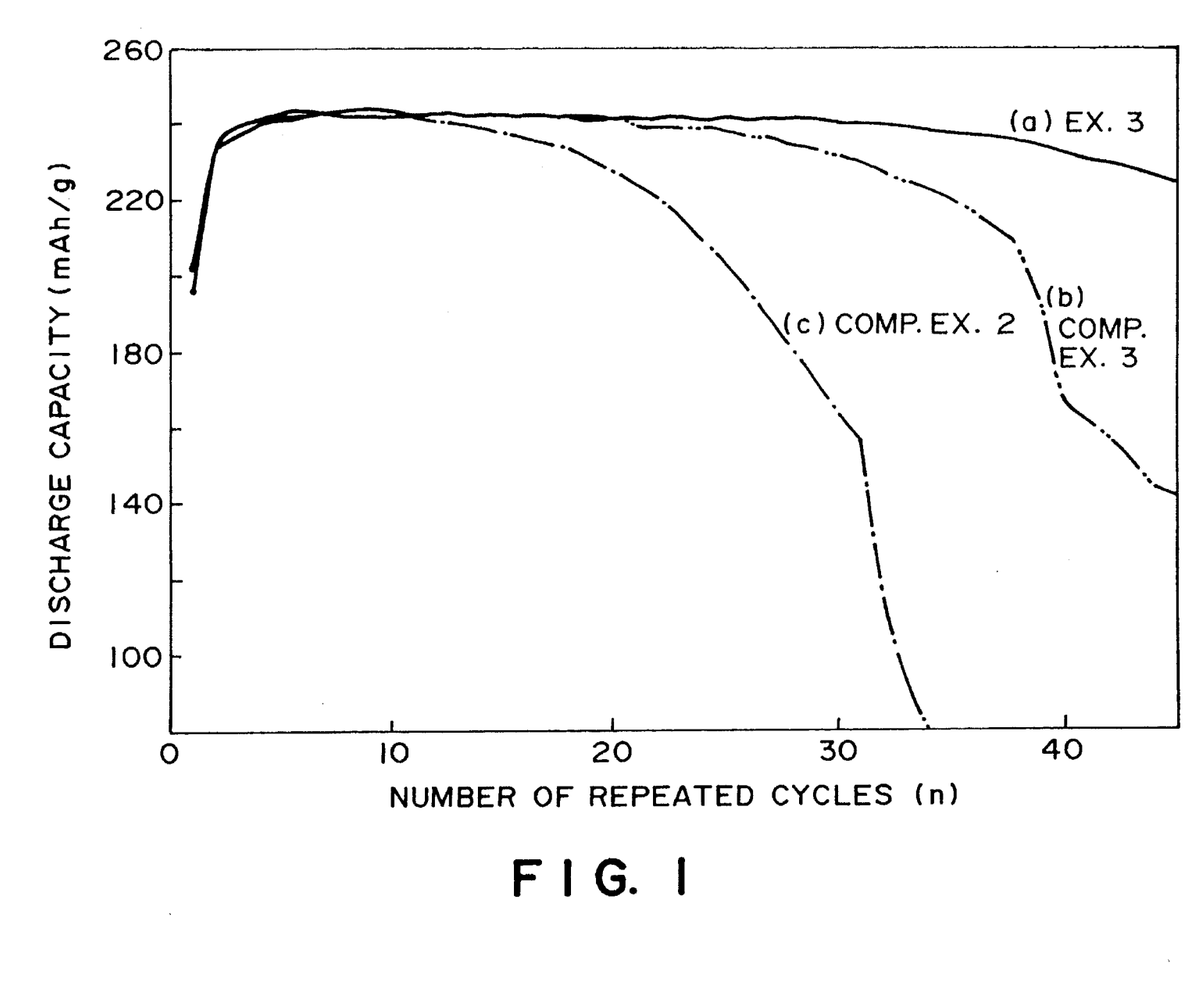
FIG. 1 is a graph showing a change with time in discharge capacity of secondary batteries having negative electrodes of carbonaceous materials according to Example 3 of the present invention and Comparative Examples as a result of a charge-discharge cycling test.

The thus-prepared secondary battery was subjected to a continuous charge-discharge cycling test including a cycle of a charge capacity of 250 mAh/g-carbon, a charging upper limit voltage of 4.3 volts, a discharge termination voltage of 2.5 volts, and a charge-discharge current density of 0.86 mA/cm$^2$. The results are inclusively shown in FIG. 1. In FIG. 1, the curves (a), (b) and (c) represent the charge-discharge characteristics curves of the secondary batteries having negative electrodes formed by using the carbonaceous materials of Examples 3, Comparative Example 3 and Comparative Example 2, respectively.

As is clear from FIG. 1, the secondary battery (a) having a negative electrode formed by using a carbonaceous material of Example 2 having an optically anisotropic fine mosaic texture showed a remarkably better charge-discharge cycle characteristic compared with the secondary batteries (b) and (c) having negative electrodes formed by using carbonaceous materials of Comparative Examples 2 (curve (c)) and 3 (curve (b)) having an optically anisotropic flow-texture including large regions in which the crystallites were aligned in identical directions.

EXAMPLE 9

A reaction vessel equipped with a stirrer and having an inner volume of 20 liters was charged with 15 kg of ethylene bottom oil having a residual carbon content of 14.1% and a density of 1.09 g/cm$^3$, and 2 kg of 61%-nitric acid was added thereto under stirring and cooling so as to keep the temperature at 40° C. or below, followed by 2 hours of reaction. Then, the mixture was held at 80° C. for 1 hour, heated to 380° C. at a rate of 100° C./hr and reacted at 380° C. for 2 hours, followed by cooling to obtain a crosslinked pitch at a yield of 36.1% with respect to the starting ethylene bottom oil.

The crosslinked pitch showed a softening point of 284° C., a volatile content of 28.3%, an oxygen content of 0.5%, a nitrogen content of 1.3%, and an H/C atomic ratio of 0.63.

The crosslinked pitch was heat-treated in a nitrogen gas stream at 600° C. for 1 hour, followed by cooling and pulverization to obtain carbon precursor particles having an average particle size of 25 μm The carbon precursor particles were then carbonized in a nitrogen gas stream at 1000° C. for 1 hour and then graphitized in an Ar gas stream at 2800° C. for 1 hour to obtain a graphitic material.

The properties of the graphitic material are inclusively shown in Table 3 appearing hereinafter.

EXAMPLE 10

68 kg of a petroleum pitch having a softening point of 210° C., a quinoline-insoluble content of 1 wt. % and an H/C atomic ratio of 0.63, and 32 kg of naphthalene, were placed in a 300 liter-pressure-resistant vessel equipped with stirring blades, melt-mixed under heating at 190° C. and, after being cooled to 80°–90° C., extruded to form an about 500 μm dia.-string-shaped product. Then, the string-shaped product was broken so as to provide a diameter-to-length ratio of about 1.5, and the broken product was charged into an aqueous solution containing 0.53% of polyvinyl alcohol (saponification degree=88%) and heated to 93° C., followed by stirring for dispersion and cooling to form a slurry of pitch spheres. After removing a major part of water by filtration, the pitch spheres were subjected to extraction with about 6 times by weight of n-hexane to remove the naphthalene in the pitch spheres. The thus-obtained porous spherical pitch was held at 165° C. for 1 hour for oxidization while passing heated air, thereby to obtain an oxidized pitch. The oxidized pitch showed an oxygen content of 2.0%.

The oxidized pitch was then heat-treated at 480° C. for 1 hour to obtain a carbon precursor having a volatile content of 4.7%. The carbon precursor was pulverized to form carbon precursor particles having an average particle size of ca. 25 μm.

Then, the carbon precursor particles were carbonized in a nitrogen stream at 1000° C. for 1 hour and then graphitized in an Ar gas stream at 2000° C. for 1 hour to obtain a graphitic material. The properties of the thus-obtained graphitic material are shown in Table 3 appearing hereinafter.

EXAMPLE 11–13

Graphitic materials were prepared in the same manner as in Example 10 except that the graphitization temperatures were changed to 2400° C. (Example 11), 2800° C. (Example 12) and 3000° C. (Example 13), respectively. The properties of the graphitic materials are also shown in Table 3.

Figure 7:
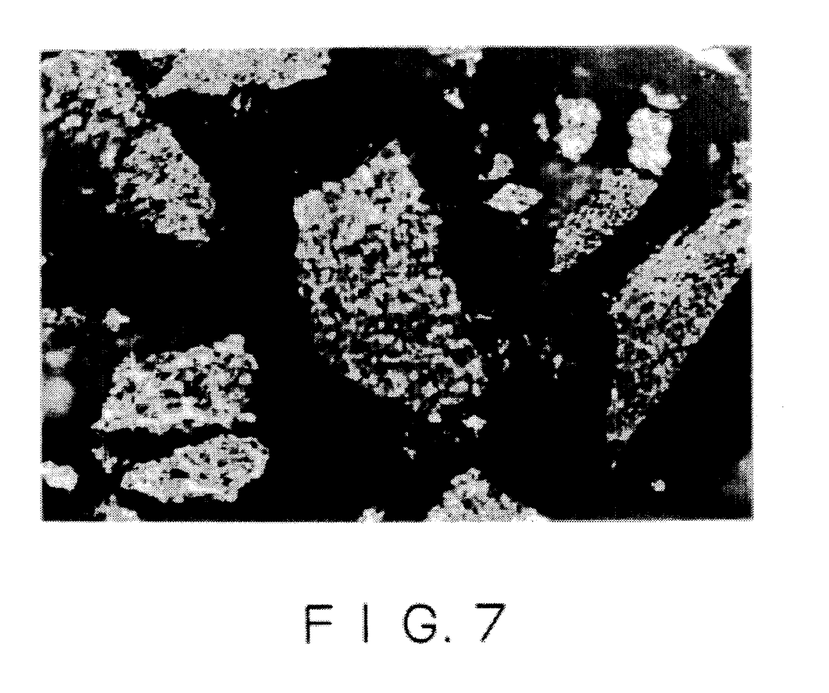

The graphitic materials of the above Examples 9–13 all showed an optically anisotropic texture of a fine mosaic, a polarizing microscopic photographs (×1000) of the graphitic material of Example 12 is representatively shown as FIG. 7.

COMPARATIVE EXAMPLE 6

The petroleum pitch used in Example 10 was heat-treated in a nitrogen atmosphere at 600° C. for 1 hour and pulverized to form carbon precursor particles having an average particle size of 25 μm. The carbon precursor particles were carbonized in a nitrogen gas stream at 1000° C. for 1 hour and then graphitized in an Ar gas stream at 2800° C. for 1 hour to obtain a carbonaceous material.

Figure 8:
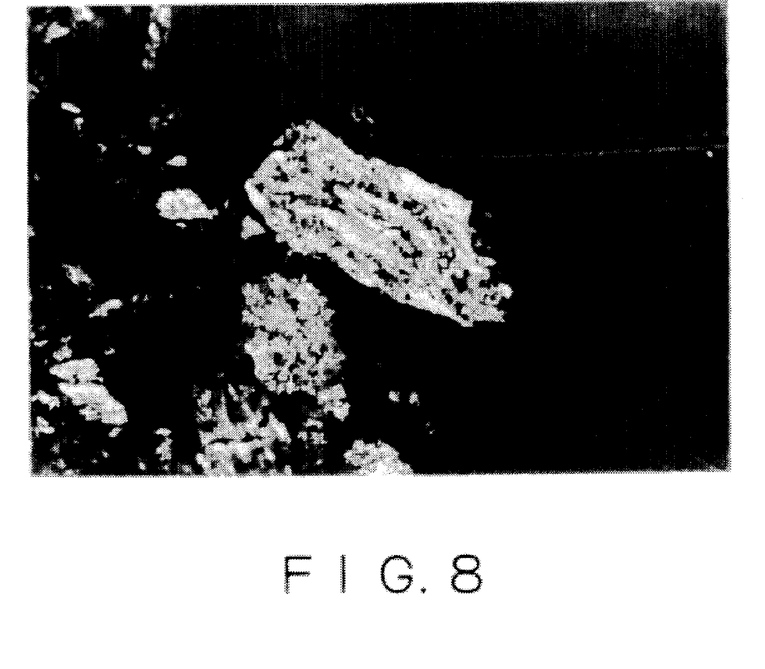

As a result of observation through a polarizing microscope, the carbonaceous material exhibited an optically anisotropic texture which was not of a fine mosaic but of a flow texture as shown in FIG. 8 which is a polarizing microscopic photographic (×1000) thereof. The properties of the carbonaceous material are also shown in Table 3.

COMPARATIVE EXAMPLE 7

The porous spherical pitch obtained in Example 10 was oxidized by holding it at 260° C. for 1 hour while passing heated air, thereby obtaining an oxidized pitch, which showed an oxygen content of 16%.

The oxidized pitch was heat-treated in a nitrogen atmosphere at 600° C. for 1 hour and then pulverized to form carbon precursor particles having an average particle size of ca. 25 μm. Then, the carbon precursor particles were carbonized in a nitrogen gas stream at 1200° C. for 1 hour and further graphitized in an Ar gas stream at 2800° C. for 1 hour to obtain a carbonaceous material.

Figure 9:
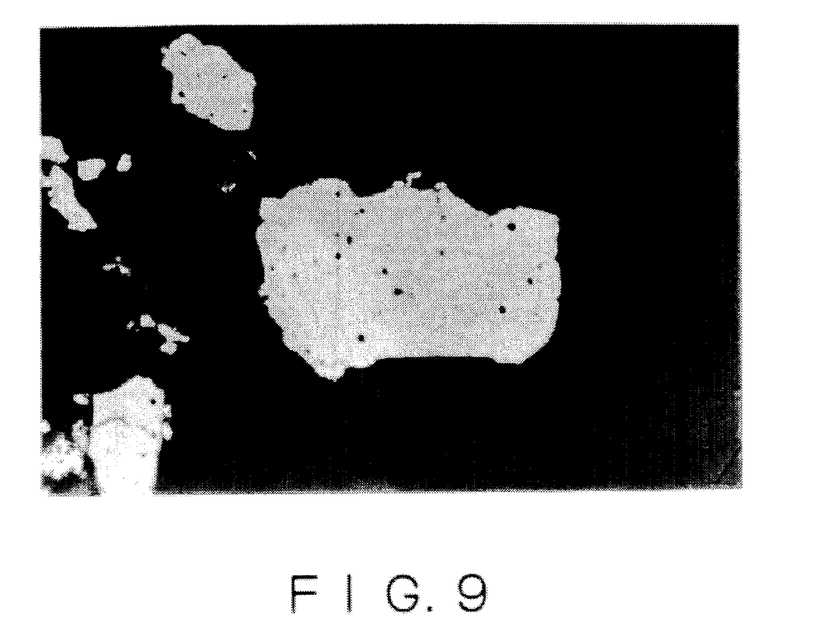
Figure 10:
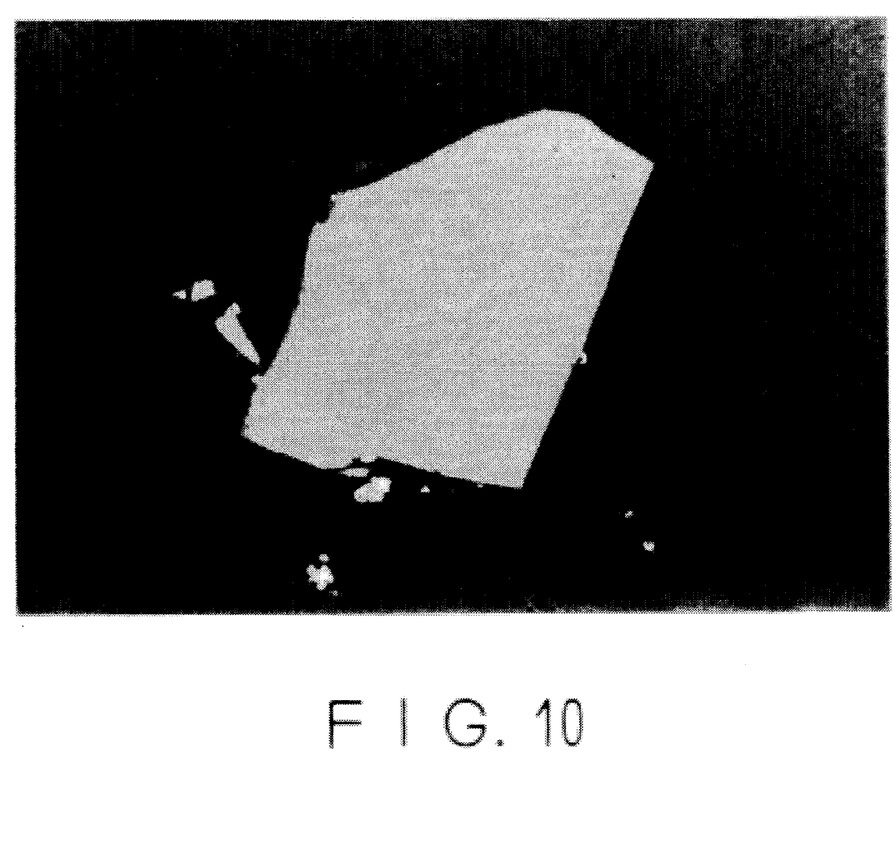

As a result of observation through a polarizing microscope, the carbonaceous material failed to show an optically anisotropic mosaic texture but showed an isotropic texture as shown in FIG. 9 which is a polarizing microscopic photograph (×1000) thereof.

The properties of the carbonaceous material are also shown in Table 3.

COMPARATIVE EXAMPLE 8

A carbonaceous material was prepared by processing polyvinyl chloride (PVC) of an average polymerization degree of 700 in the same manner as in Comparative Example 6.

As a result of polarizing microscopic observation, the carbonaceous material exhibited an optically anisotropic texture which was not of a fine mosaic but of a flow texture. The properties of the carbonaceous material are also shown in Table 3.

COMPARATIVE EXAMPLE 9

A carbonaceous material was prepared by processing polyvinylidene chloride (PVDC) in the same manner as in Comparative Example 6.

As a result of observation through a polarizing microscope, the carbonaceous material failed to show an optically anisotropic mosaic texture but showed an isotropic texture. The properties of the carbonaceous material are also shown in Table 3.

COMPARATIVE EXAMPLE 10

121.6 g of 37%-formarin was added to 47.1 g of phenol, and the mixture was heated at 60° C. under stirring, followed further by dropwise addition of 3.8 g of 29%-aqueous ammonia solution and reaction at 80° C. for 6 hours. Then, the system was cooled to room temperature, and 6.4 g of lactic acid was added thereto to neutralize the reaction liquid, thereby obtaining a viscous pre-condensate, which was then condensed at 150° C. for 12 hours to form a resol-type resin. The resin was pre-calcined in a nitrogen gas stream at 500° C. for 1 hour to form a carbon precursor, followed by pulverization to form carbon precursor particles having an average particle size of 25 μm. Then, the carbon precursor particles were carbonized in a nitrogen gas stream at 1000° C. for 1 hour and then further graphitized in an Ar gas stream at 2800° C. for 1 hour to obtain a carbonaceous material.

As a result of observation through a polarizing microscope, the carbonaceous material failed to show an optically anisotropic texture but showed an isotropic texture. The properties of the carbonaceous material are also shown in Table 3.

COMPARATIVE EXAMPLE 11

Flaky graphite produced in Madagascar ("CP", available from Nippon Kokuen Shoji K.K.) was used.

The natural graphite showed a fixed carbon content of 97%, an ash content of 2%, a volatile content of 1% and an average particle size of 7 μm. The properties of the natural graphite are also shown in Table 3.

[Doping/Dedoping test]

Positive electrodes were prepared in the same manner as in Examples 1–8 by using the carbonaceous materials obtained in the above Examples and Comparative Examples, and non-aqueous solvent-type lithium secondary batteries were prepared therefrom and evaluated in the following manner.

The negative electrodes were prepared by stamping a 1 mm-thick metal lithium plate into 21 mm-dia. disks.

The thus-prepared positive and negative electrodes were disposed opposite to each other with a porous polypropylene film as a separator disposed therebetween, and the resultant structure was dipped in an electrolytic solution comprising a 1:1 (by volume)-mixture solvent of ethylene carbonate and diethyl carbonate and $LiPF_6$ added thereto at a rate of 1 mol/liter, thereby forming a non-aqueous solvent-type lithium secondary battery.

In the lithium second battery thus-constituted, the doping and dedoping of the carbonaceous material with lithium were performed and the capacities thereof were measured.

The doping was performed at a constant current density of 1.0 $mA/cm^2$ up to a terminal voltage of 10 mV and thereafter performed at a constant terminal voltage of 10 mV. The current conduction for the doping was performed for 10 hours. The electricity thus flowed was divided by the weight of the carbonaceous material to provide a doping capacity (A) in terms of mAh/g.

Then, in a similar manner, a current was flowed in a reverse direction to dedope the lithium from the doped carbonaceous material. The dedoping was performed at a constant current density of 1.0 $mA/cm^2$ up to a terminal voltage of 3.0 volts. The electricity thus flowed was divided by the weight of the carbonaceous material to provide a dedoping capacity (B) in terms of mAh/g. Then, an irreversible capacity (A–B) was calculated as a difference between the doping capacity (A) and the dedoping capacity (B), and a discharge efficiency (%) was obtained by dividing the dedoping capacity (B) with the doping capacity (A) and multiplying the quotient (B/A) with 100.

The performances of the lithium secondary batteries using positive electrodes of the respective carbonaceous materials measured in the above-described manner are summarized in Table 4. Further, capacities per unit volume (in terms of "$mAh/cm^3$") obtained by multiplying the doping and dedoping capacities with the true density of the carbonaceous material concerned are also shown in Table 4 as values in parentheses.

From Table 4, it is understood that the secondary batteries obtained by using the graphitic materials of Examples according to the present invention showed larger doping and dedoping capacities and smaller irreversible capacities compared with the batteries obtained by using the carbonaceous materials of Comparative Examples 7–11.

The carbonaceous materials obtained in Comparative Examples 7, 9 and 10 are non-graphitizable carbon as clearly understood from Table 3, and these materials are disadvantageous since they provide electrode materials having a small true density and can only provide secondary batteries having a small capacity per unit volume (see Table 4).

The secondary battery obtained by using natural graphite exhibited a large irreversible capacity. This may be attributable to too large a crystallite size of the natural graphite such that lithium could not be easily introduced between graphite layers and the electricity consumed by decomposition of the electrolytic solution due to an over potential might be observed as an irreversible capacity.

[Quick charge-discharge test]

Secondary batteries having positive electrodes constituted by using carbonaceous materials of some Examples and Comparative Examples 6–11 were subjected to a quick charge-discharge test in the following manner.

A comparative test was performed by constituting lithium secondary batteries similar to those used in the above Doping/Dedoping test by using the graphitic material of Example 12 and the carbonaceous materials of Comparative Examples 6, 8 and 11 all having a developed graphite structure as positive electrode materials.

Each battery (cell) was subjected to doping-dedoping at varying current densities of 0.5 $mA/cm^2$, 1 $mA/cm^2$, 2 $mA/cm^2$ and 3 $mA/cm^2$.

The doping was performed at predetermined constant current densities described above until the terminal voltage reached 10 mV and thereafter at a constant terminal voltage of 10 mV. The doping time Y (hours) was set so that product of X and Y would be 10 wherein X ($mA/cm^2$) was an initial current density. The dedoping was performed at a constant current density which was identical to the initial current density at the time of the doping and terminated when the terminal voltage reached 1.5 volts.

Figure 11:
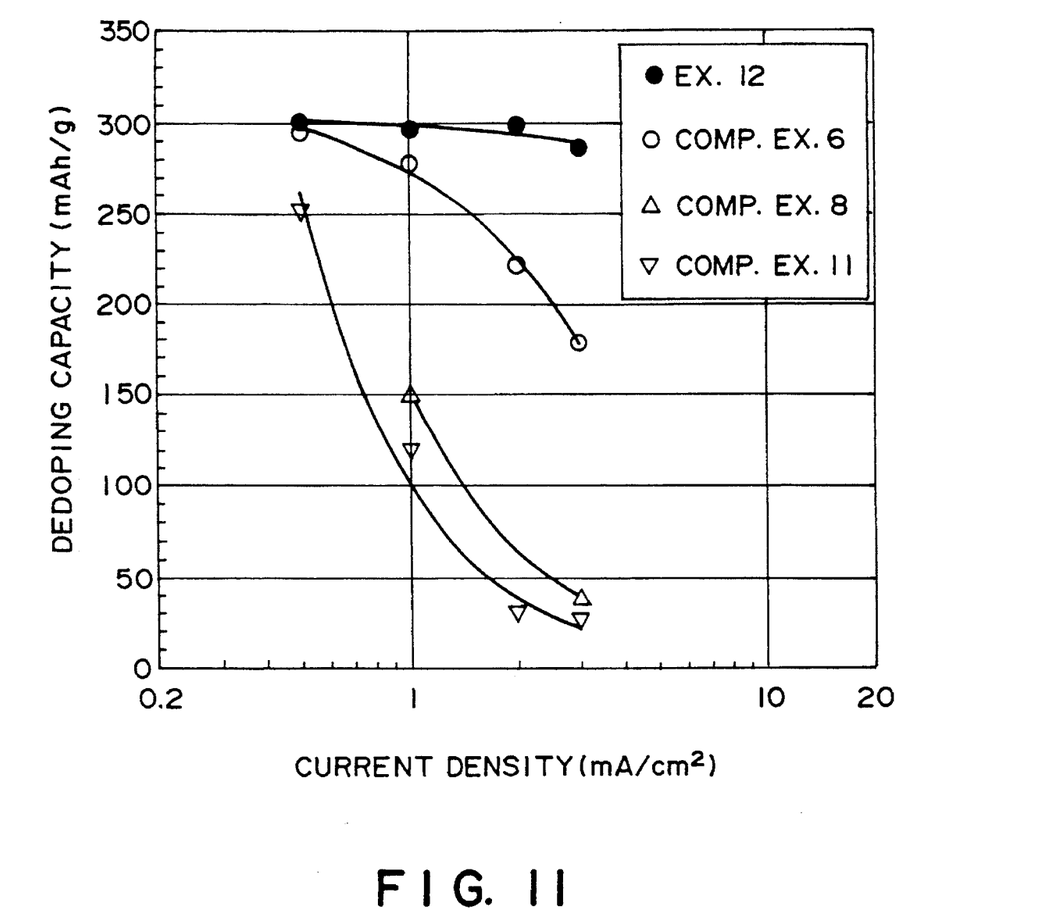
FIG. 11 is a graph showing a relationship between current density and dedoping capacity of secondary batteries having positive electrodes of carbonaceous materials according to Example 12 and Comparative Examples appearing hereinafter.

Relationships between the dedoping capacity (mAh/g) and the initial current density (mA/cm$^2$) in the first series of doping-dedoping are shown in FIG. 11.

In view of the results shown in Table 3 and FIG. 11 in combination, the secondary battery obtained by using a graphitic material showing an optically anisotropic texture of a fine mosaic as observed through a polarizing microscope provided a larger dedoping capacity in charge-discharge operation at a high current density and thus allowing a quick charge-discharge compared with secondary batteries obtained by using carbonaceous materials of Comparative Examples 6, 8 and 11 having large $Lc_{(002)}$ and $La_{(110)}$ values.

solvent-type secondary battery, comprising a carbonaceous material having an average (002)-plane spacing $d_{002}$ of 0.336–0.375 nm and a crystallite size in c-axis direction $Lc_{(002)}$ of at most 50 nm, respectively, as measured by X-ray diffraction method, and an optically anisotropic texture showing a fine mosaic texture when observed through a polarizing microscope.

2. A carbonaceous electrode material according to claim 1, having a $d_{002}$ of 0.340–0.375 nm and an $Lc_{(002)}$ of at most 15 nm.

3. A carbonaceous electrode material according to claim 1, which is graphitic and has a $d_{002}$ of 0.336–0.350 nm, an $Lc_{(002)}$ which exceeds 15 nm and at most 50 nm, and a crystallite size in a-axis direction $La_{(110)}$ of 5–50 nm.

TABLE 3

Basic properties of carbonaceous material

| | | Graphitization | Properties of graphitic material | | | | |
|---|---|---|---|---|---|---|---|
| Example | Raw material | Temperature (°C.) | $d_{002}$ (nm) | $Lc_{(002)}$ (nm) | $La_{(110)}$ (nm) | True density (g/cm3) | Optical texture |
| Ex. 9 | petro. pitch | 2800 | 0.338 | 28 | 35 | 2.2 | fine mosaic |
| 10 | petro. pitch | 2000 | 0.345 | 19 | 14 | 2.16 | fine mosaic |
| 11 | petro. pitch | 2400 | 0.341 | 25 | 32 | 2.2 | fine mosaic |
| 12 | petro. pitch | 2800 | 0.339 | 30 | 36 | 2.21 | fine mosaic |
| 13 | petro. pitch | 3000 | 0.338 | 30 | 40 | 2.23 | fine mosaic |
| Comp. Ex. 6 | petro. pitdi | 2800 | 0.338 | 44 | 65 | 2.25 | flow |
| 7 | petro. pitch | 2800 | 0.349 | 14 | 8 | 1.64 | isotropic |
| 8 | PVC | 2800 | 0.338 | 69 | 98 | 2.25 | flow |
| 9 | PVDC | 2800 | 0.349 | 23 | 25 | 1.6 | isotropic |
| 10 | phenolic resin | 2800 | 0.353 | 26 | 33 | 1.63 | isotropic |
| 11 | natural graphite | — | 0.335 | >100 | >100 | 2.27 | — |

TABLE 4

Cell performances

| Example | Raw material | Doping capacity (A) mAh/g (mAh/cm$^3$) | Doping capacity (B) mAh/g (mAh/cm$^3$) | Irreversible capacities (A-B) mAh/g (mAh/cm$^3$) | Discharge efficiency (B/A) × 100 % |
|---|---|---|---|---|---|
| Ex. 9 | petro. pitch | 325 (715) | 280 (616) | 45 (99) | 86.2 |
| 10 | petro. pitch | 248 (536) | 220 (475) | 28 (61) | 88.7 |
| 11 | petro. pitch | 292 (642) | 262 (576) | 30 (66) | 89.9 |
| 12 | petro. pitch | 337 (743) | 297 (656) | 40 (88) | 88.1 |
| 13 | petro. pitch | 334 (745) | 299 (667) | 35 (78) | 89.5 |
| Comp. Ex. 6 | petro. pitch | 344 (774) | 293 (659) | 51 (114) | 85.2 |
| 7 | petro. pitch | 270 (443) | 226 (371) | 45 (74) | 83.7 |
| 8 | PVC | 244 (549) | 157 (353) | 87 (196) | 64.3 |
| 9 | PVDC | 256 (410) | 175 (280) | 81 (130) | 68.3 |
| 10 | phenlic resin | 218 (355) | 165 (270) | 53 (86) | 75.7 |
| 11 | natural graphite | 245 (556) | 119 (270) | 126 (286) | 48.6 |

What is claimed is:

1. A carbonaceous electrode material for a non-aqueous

4. A carbonaceous electrode material according to claim 3, having a true density of at least 1.90 g/cm$^3$.

5. An electrode structure for a non-aqueous solvent-type secondary battery, comprising: an electroconductive substrate and a composite electrode layer disposed on at least one surface of the electroconductive substance;

said composite electrode layer comprising a carbonaceous electrode material according to any one of claims 1–4 in a particulate form, and a binder.

6. A non-aqueous solvent-type secondary battery, comprising, a positive electrode, a negative electrode, and a separator and a non-aqueous electrolytic solution disposed between the positive and negative electrodes;

at least one of said positive and negative electrodes comprising an electrode structure according to claim 5.

7. A secondary battery according to claim 6, wherein the electrode structure constitutes the negative electrode.

8. A process for making a carbonaceous electrode material for a non-aqueous solvent-type secondary battery, comprising the steps of:

crosslinking a tar or pitch of a petroleum or coal origin, and carbonizing the crosslinked tar or pitch at a temperature of at least 800° C. under a reduced pressure or in an inert gas atmosphere, to obtain a carbonaceous material having an average (002)-plane spacing $d_{002}$ of 0.336–0.375 nm and a crystallite size in c-axis direction $Lc_{(002)}$ of at most 50 nm, respectively, as measured by X-ray diffraction method, and an optically anisotropic texture showing a fine mosaic texture when observed through a polarizing microscope.

9. A process according to claim 8, wherein the crosslinked tar or pitch is carbonized, to obtain the carbonaceous material with a $d_{002}$ of 0.340–0.375 nm and an $Lc_{(002)}$ of at most 15 nm.

10. A process according to claim 8, wherein the carbonizing step includes a graphitizing treatment at a temperature of at least 1800° C. so that the resultant carbonaceous material will be graphitic and have a $d_{002}$ of 0.336–0.350 nm, an $Lc_{(002)}$ which exceeds 15 nm and at most 50 nm, and a crystallite size in a-axis direction $La_{(110)}$ of 5–50 nm.

11. A process according to any of claims 8–10, wherein the crosslinking step comprises treating the tar or pitch of a petroleum or coal origin with nitric acid.

12. A process according to any of claims 8–10, wherein the crosslinking step includes:

mixing under heating the pitch with an additive comprising an aromatic compound having two or three rings and a boiling point of at least 200° C., shaping the resultant mixture to form a shaped pitch product, extracting the additive from the shaped pitch product with a solvent showing a low dissolving power to the pitch and a high dissolving power to the additive, thereby to leave a porous pitch product, and oxidizing the porous pitch product for crosslinking.

13. A process according to claim 12, wherein the porous pitch product is oxidized with an oxygen-containing gas for the crosslinking.

14. A process according to any of claims 8–10, wherein the crosslinked tar or pitch is heat-treated to form a carbon precursor having a volatile content of at most 15%, and the carbon precursor is pulverized into an average particle size of at most 100 μm and then subjected to the carbonizing step.

* * * * *